United States Patent

Kuo

[11] Patent Number: 5,975,073
[45] Date of Patent: Nov. 2, 1999

[54] OVEN STRUCTURE

[76] Inventor: Chung Chin Kuo, 5F, No. 2, Lane 21, Hou St., Taipei, Taiwan

[21] Appl. No.: 09/219,159

[22] Filed: Dec. 22, 1998

[51] Int. Cl.⁶ .............................. A47J 37/00; F24C 3/00
[52] U.S. Cl. ................ 126/41 R; 126/41 A; 126/275 R; 99/401; 99/446; 99/447
[58] Field of Search ............................... 126/41 R, 41 A, 126/41 B, 25 R, 376, 373, 375, 390, 275 R; 99/446–449, 401, 340, 450, 339

[56] References Cited

U.S. PATENT DOCUMENTS

| | | | |
|---|---|---|---|
| 3,477,362 | 11/1969 | Peebles | 99/447 |
| 4,532,911 | 8/1985 | Orter | 126/376 |
| 4,944,284 | 7/1990 | O'Quin | 126/41 R |
| 5,555,795 | 9/1996 | Tsai | 126/275 R |

*Primary Examiner*—James C. Yeung
*Attorney, Agent, or Firm*—Rosenberg, Klein & Lee

[57] ABSTRACT

The present invention relates to an oven structure including a set of baking cylinders, an outer barrel and an inner barrel, wherein the baking cylinders are mounted in an interior of the inner barrel; and a gas burner is mounted between the inner and outer barrels such that use the gas burning to heat the baking cylinders and bake the food which are put in the interior of the baking cylinders. It is full of practical value to keep the best taste of food by the indirect and dry ways of evenly heating.

11 Claims, 6 Drawing Sheets

OVEN STRUCTURE

BACKGROUND OF THE INVENTION

In many conventional cooking systems for baking ducks or roasting meats, the food item is heated directly by a heating fire. This method of direct cooking often results in uneven heating. Often, one side of the food item is over-cooked while the other side remains under-cooked. In other conventional cooking systems, a whirlwind baking method is employed. Though this method yields a more even heating of food, the fire source makes direct contact with the food item such that it is easily charred. In yet other conventional cooking systems, heating is accomplished through an earth crucible. The food is first covered with an aluminum foil for sanitary reasons. Although this may protect flavor in some ways, the resulting immersion of the food item in water and fat/grease within the covering results in a loss of desirable texture. This causes a general reduction in overall quality and taste, leading to consumer dissatisfaction.

Therefore, in accordance with the present invention, an oven structure is provided which consistently produces cooked food having great taste in a manner previously unseen. A description of the characteristics and effects of the present invention is made with reference to the following Drawings:

DETAILED DESCRIPTION OF THE PREFERRED EMBODIMENTS

Figure 1:
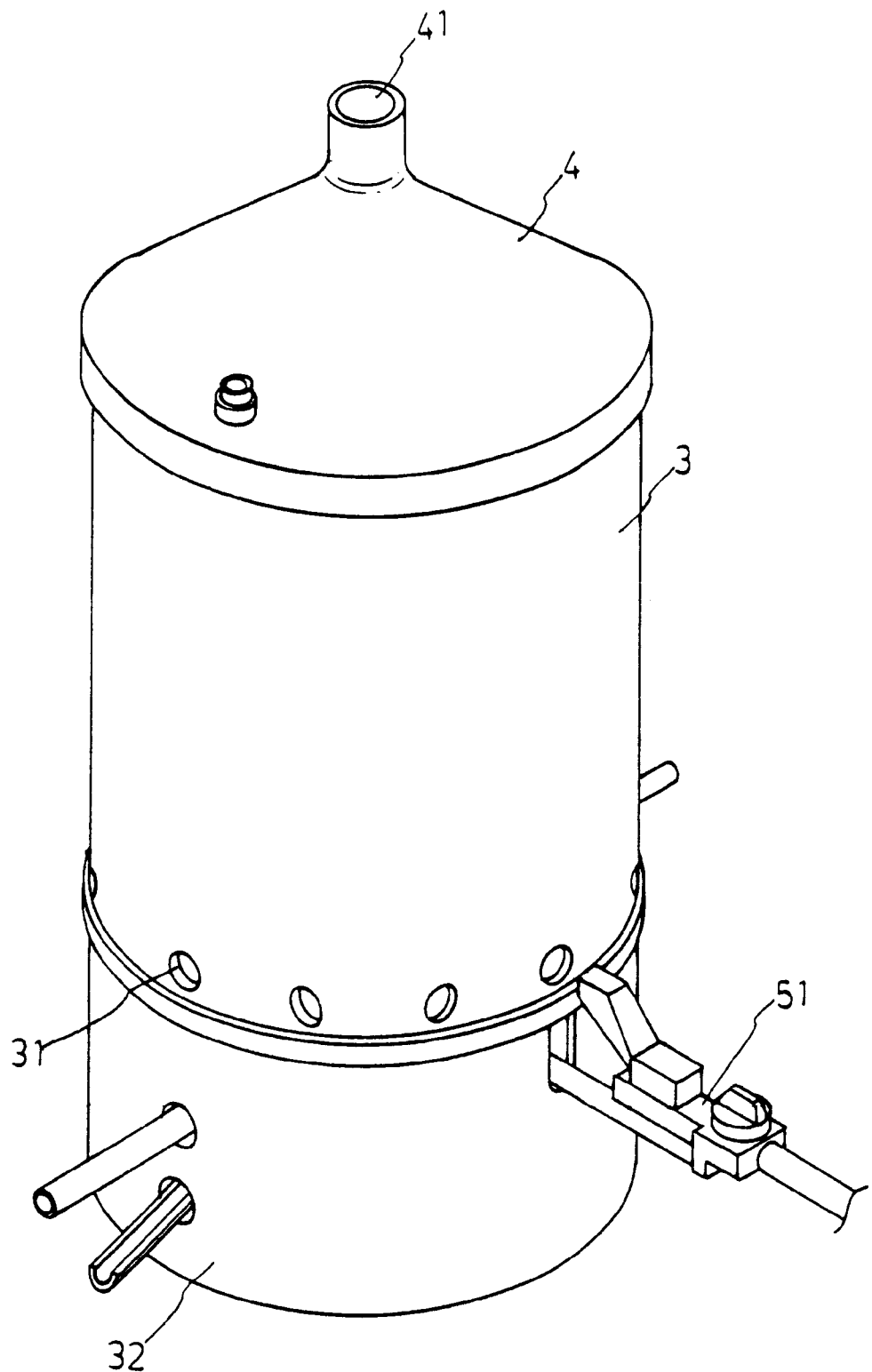
FIG. 1 is a perspective view of one embodiment of the present invention.
Figure 2:
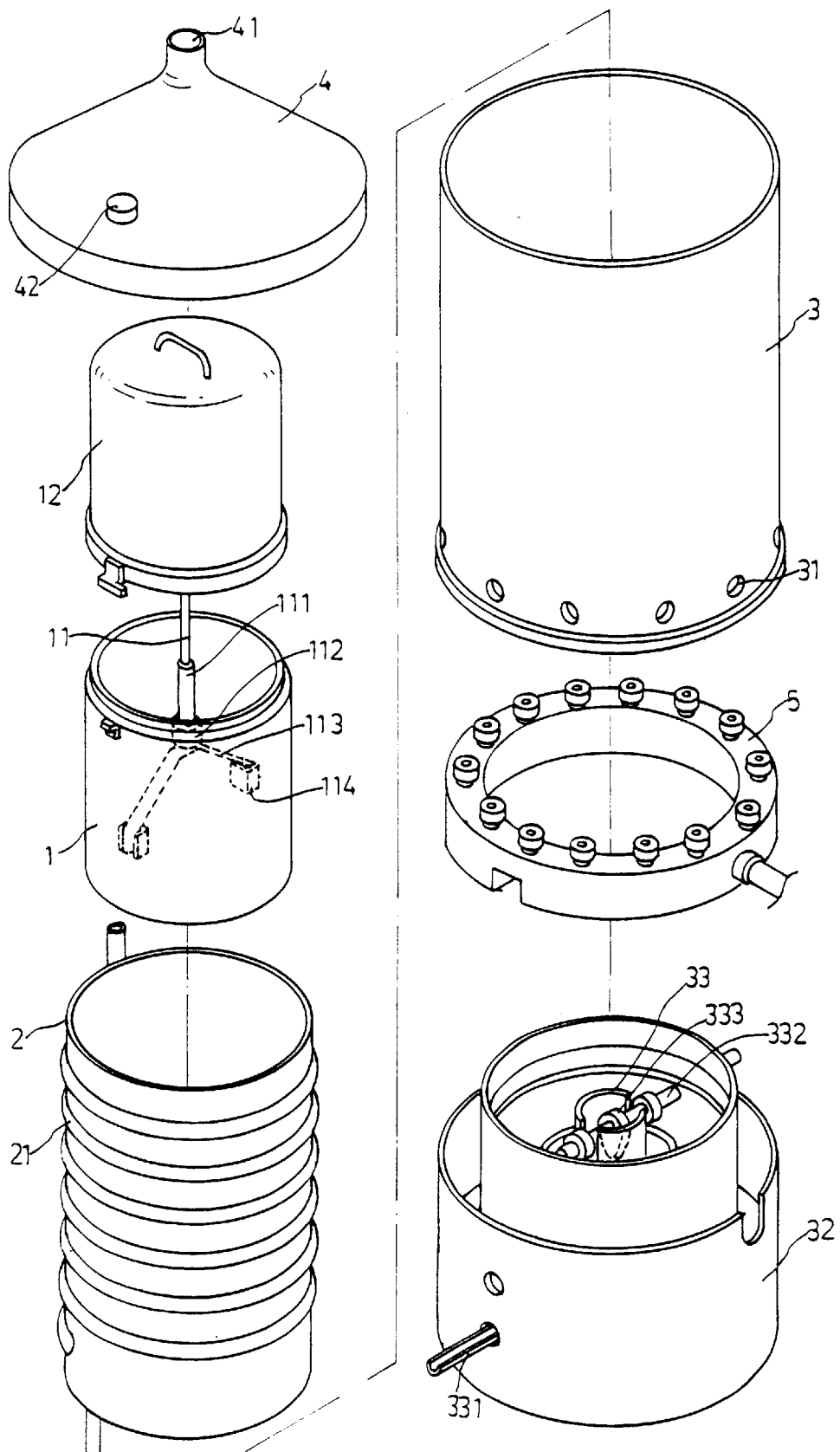
FIG. 2 is a perspective exploded view of one embodiment of the present invention.
Figure 3:
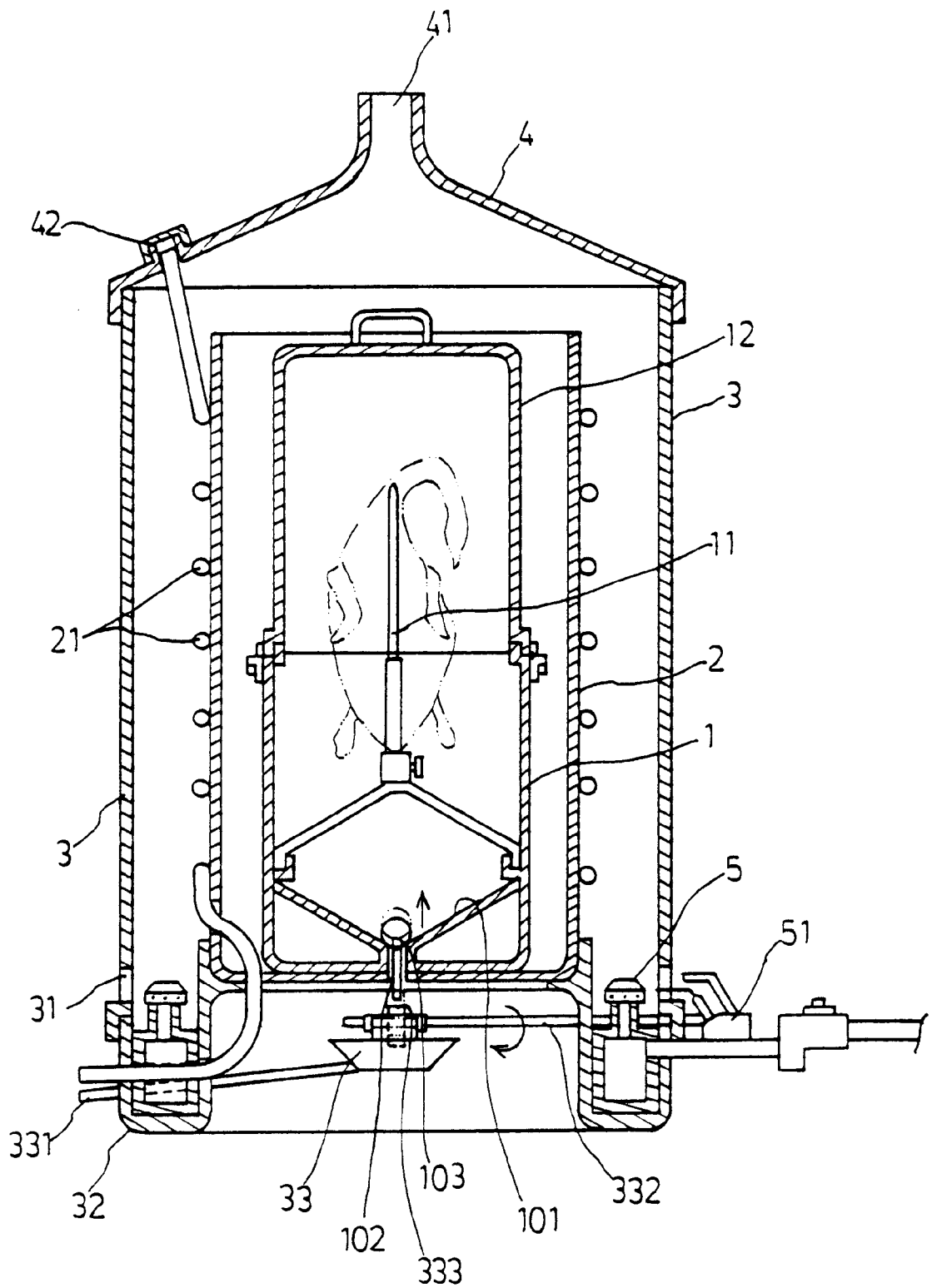
FIG. 3 is an assembly sectional view of one embodiment of the present invention.

Referring to FIGS. 1–3, an oven system in accordance with the present invention generally comprises a baking cylinder (1), an inner barrel (2), and an outer barrel (3) which are coaxially mounted on a base seat (32). The base seat (32) is generally an annular assembly having an outer annular wall portion and an inner annular wall portion. The annular wall portions are configured such that the baking cylinder (1) is disposed within the inner barrel (2). A lower portion of the inner barrel (2) is retained radially within the inner annular wall portion and disposed within the outer barrel (3). A lower edge of the outer barrel (3) engages an upper edge of the outer annular wall portion. An annular gas burner (5) is set within the base seat (32) coaxially between the outer and inner annular wall portions. An igniting switch (51) for the gas burner (5) is extended to the outside of the outer barrel (3). A supporting rod (11) is provided within the baking cylinder (1). An adjusting screw (111) and positioning sleeve (112) are also provided for adjustably setting the support rod (11). The bottom portion of the assembly includes a support foot frame (113) whose feet are inserted respectively into seats (114) formed on the baking cylinder (1). Further, a tapered flow guiding groove, or drain, plate (101) is formed at a bottom portion of the baking cylinder (1), and a drain hole (102) is formed at the drain plate's center region. A flow stopping valve (103) formed as a combination of a ball valve coupled to a rod body is set within the hole (102). The upper portion of the baking cylinder (1) may be enclosed during use by an upper cover (12). Further, an upside-down funnel, or dome, shaped upper cover (4) is provided, having a central air outlet (41) and water guide opening (42). The cover is mounted at the upper portion of the outer barrel (3). The lower periphery of the cuter barrel (3) is formed with several sensitive air inlets (31). An outer wall of the inner barrel (2) has coiled thereabout a water guiding pipe (21) whose top end may be received through the water guide opening (42) of the outer cover (4) and whose bottom end passes out through the base seat (32). Further, an oil accumulating drainage tank (33) is set below the drain hole (2) of the baking cylinder (1) in the base seat (32). At its bottom portion is provided an oil drainage pipe (331) which extends out of the base seat (32). At its upper portion is provided a rotating line (332) having a cam block (333) coupled thereto.

During operation, a food item is fixed to the supporting rod (11) in the baking cylinder (1) and preferably covered with an upper cover (12). The gas burner 5 is then ignited. The resulting heat is gradually transferred to the baking cylinder (1), raising the oven's internal temperature. Since the baking cylinder (1) is closed, it is possible to heat the food item on a supporting rod (11) while the internal temperature rises. The food item may be thoroughly cooked under a pressure and a temperature upon continuous heating, while avoiding over-baked conditions. Further, because dry heating is employed, other benefits besides even heating and enclosed burning result. For instance, the food item is not immersed in water and fat/grease. It is, thus, able to better retain its original flavor and texture. The oil droplets generated during cooking drop on the flow guiding groove plate (101) at the bottom portion of the baking cylinder (1). After cooking is completed, rotating rod (332) rotates the cam block (333) which pushes the flow stopping valve (103) upwards. The drain hole (102) is thereby opened to permit the oil to flow into a drainage tank (33), from which the flow is guided out of the base seat (32) via the oil drainage pipe (331). This output flow may be collected by another container.

Figure 4:
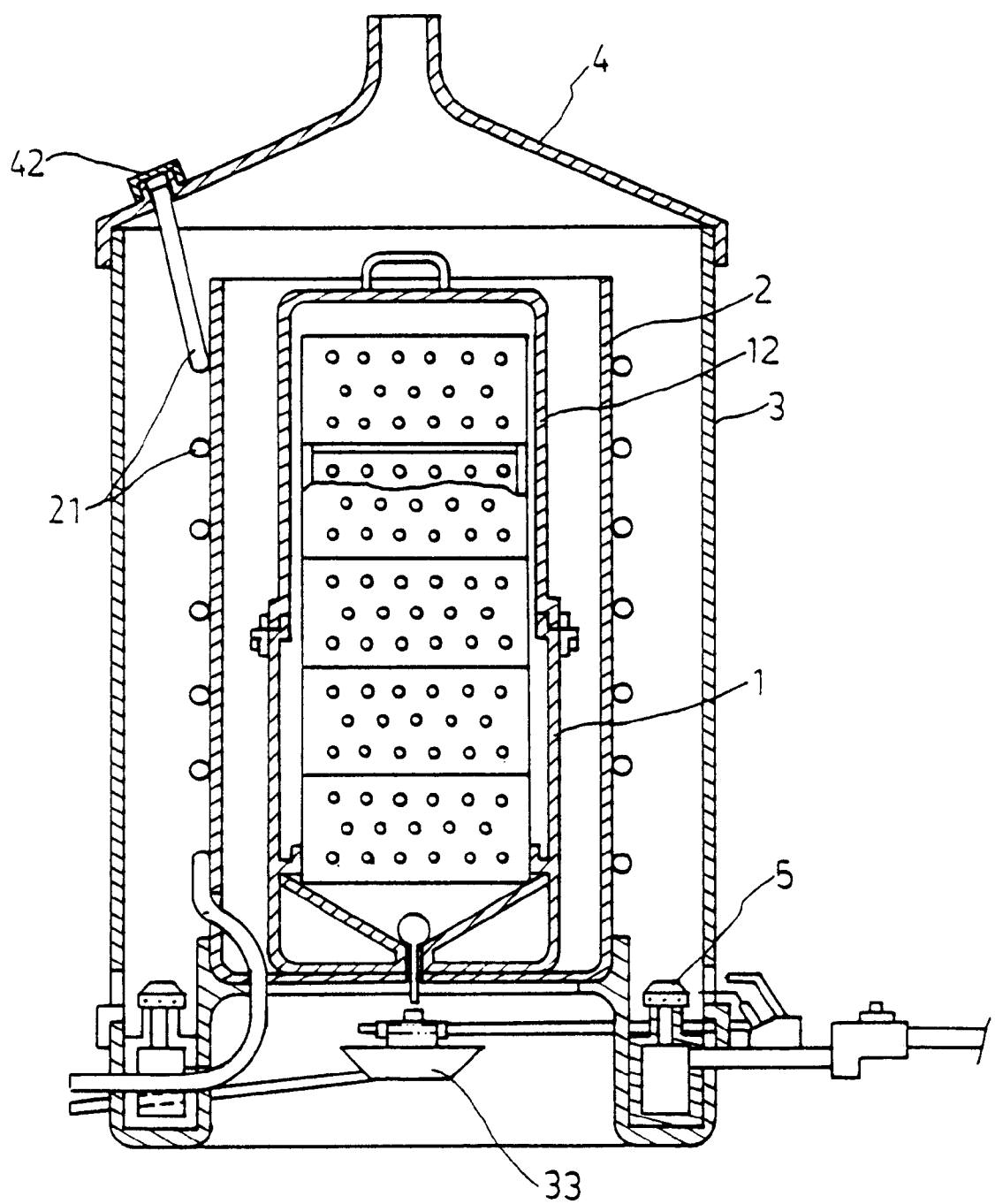
FIG. 4 is a sectional view of a first alternate embodiment of the present invention.

The supporting rod (11) in the baking cylinder (1) may, as shown in FIG. 4, be replaced by a vaporizing cage to hold the food item during cooking. Further, water may be poured in from the top end of the water guiding pipe (21) to be passed about the wall of the barrel (2) such that hot water is formed and outputted through the base seat (32) for collection. This water may be used through a flow process to circulate within the inner barrel and thereby transfer heat between components.

Figure 5:
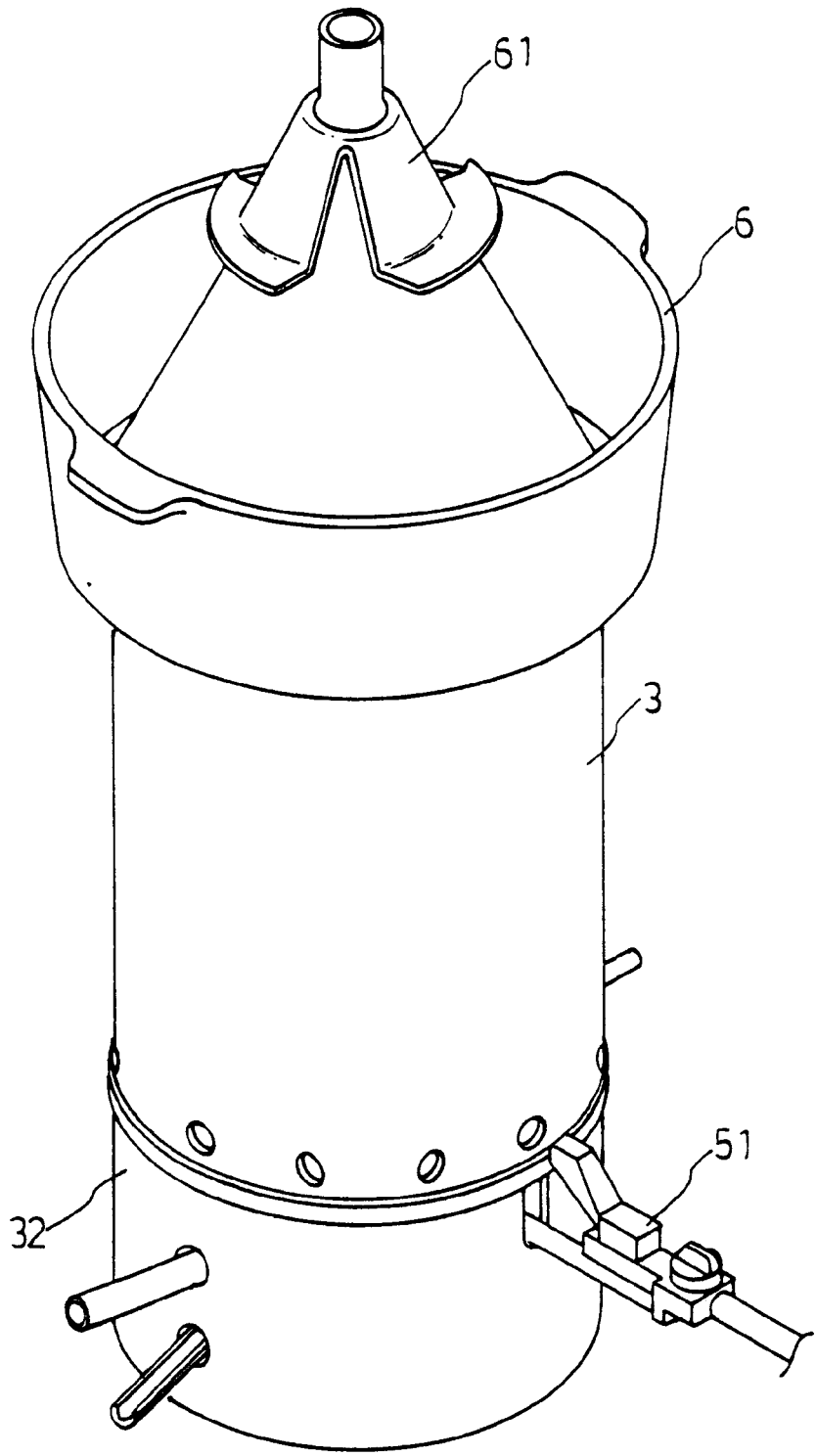
FIG. 5 is a perspective view of a second alternate embodiment of the present invention; and, FIG. 6 is a sectional plan view of the embodiment of FIG. 5.
Figure 6:
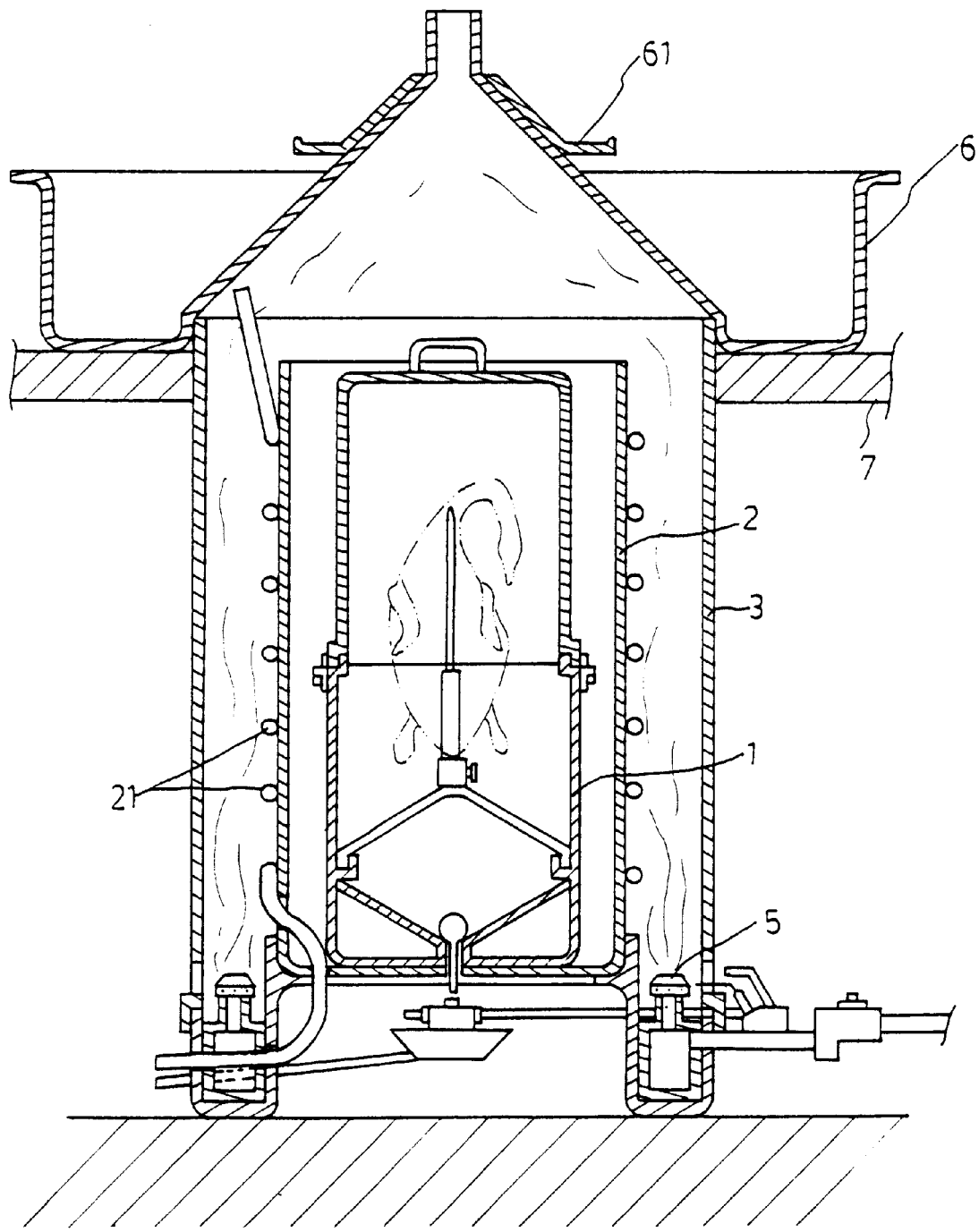

Referring to FIGS. 5 and 6, there is shown an alternate embodiment of the present invention. In this embodiment, the peripheral portions of the outer cover (6) extend radially and bend upward to form a rim of a fire pan. Further, the cover (6) is sleeve-fitted with a fan type roasting meat disk. The cover (6) may be received as shown within an opening in a table surface (7). A fire pan-baking oven for burning and roasting is then conveniently provided. Practicality is thus enhanced.

What is claimed is:

1. An oven system for uniformly heating an item comprising:

(a) a base seat assembly having substantially coaxially disposed inner and outer annular wall portions;

(b) an outer barrel coupled to said base seat, said outer barrel having a substantially tubular contour defining open upper and lower end portions, said lower end portions engaging said outer annular wall portion of said base seat;

(c) an inner barrel coupled to said base seat, said inner barrel being retained radially within said inner annular wall portion of said base seat;

(d) a baking cylinder substantially coaxially disposed within said inner barrel, said baking cylinder having a cover;

(e) a supporting assembly disposed within said baking cylinder for supporting the item;

(f) an upper cover releasably coupled to said upper end portion of said outer barrel, said upper cover having a pipe column outlet formed therein; and, (g) an annular burner coupled to said base seat substantially coaxially between said inner and outer annular wall portions thereof.

2. The oven system as recited in claim 1 wherein said cover includes a domed portion extending radially about said pipe column outlet.

3. The oven system as recited in claim 2 wherein said supporting assembly includes a supporting rod extending axially within said baking cylinder for impaled support of the item.

4. The oven system as recited in claim 3 wherein said supporting assembly further includes: a foot frame for releasably engaging an inner surface of said baking cylinder; and, means for adjustably coupling said supporting rod to said foot frame.

5. The oven system as recited in claim 2 wherein said upper cover further includes an annular rim portion defined substantially coaxially about said domed portion, and a shoulder portion extending radially therebetween.

6. The oven system as recited in claim 5 further comprising a fan type roasting disk coaxially coupled to said pipe column outlet.

7. The oven system as recited in claim 1 further comprising a pipe member coiled about said inner barrel for guiding liquid therethrough.

8. The oven system as recited in claim 1 wherein said baking cylinder has formed at a lower section thereof: a drain hole; and, a tapered drain plate for receiving and draining liquid from the item to said drain hole.

9. The oven system as recited in claim 8 wherein said baking cylinder includes a valve means for selectively sealing said drain hole.

10. The oven system as recited in claim 9 further comprising a drainage tank coupled to said base seat, said drainage tank being disposed beneath said baking cylinder for receiving liquid released through said drain hole.

11. The oven system as recited in claim 10 further comprising an actuation assembly for actuating said valve means of said baking cylinder, said actuation assembly including: a rotatable outputting pipe extending radially through said base seat; and, a cam block coupled to said outputting pipe for engaging said valve means responsive to a rotation of said outputting pipe.

\* \* \* \* \*